Patented July 12, 1949

2,475,678

UNITED STATES PATENT OFFICE 2,475,678

HIGHER CELLULOSE ESTERS

Robert D. Rowley, Narrows, Va., assignor to Celanese Corporation of America, a corporation of Delaware No Drawing. Application September 11, 1945, Serial No. 615,693

2 Claims. (Cl. 260—227)

This invention relates to the production of organic acid esters of cellulose, and relates more particularly to the production of cellulose triesters which are highly stable and which may be precipitated in a soft and open fibrous form so that they may be easily washed or otherwise treated.

An object of this invention is the provision of an improved process for the production of stable organic acid esters of cellulose of a higher degree of esterification from organic acid esters of cellulose of a lower degree of esterification.

Another object of this invention is the preparation of cellulose tri-acetate of improved stability and other physical characteristics by a process comprising the acetylation of cellulose acetates of a lower degree of acetylation.

A further object of this invention is the preparation of organic acid esters of cellulose of high degree of esterification, including mixed organic acid esters of cellulose, without the use of catalysts such as sulfuric acid or the like to aid the esterification.

Other objects of this invention will appear from the following detailed description.

In the process of preparing organic acid esters of cellulose, such as cellulose acetate, for example, the esterification reaction is usually carried out by treating cellulose with an organic acid anhydride in the presence of a catalyst such as sulfuric acid and an organic acid diluent, or solvent, for the cellulose ester being formed. The esterified cellulose is obtained in the form of a viscous, homogeneous solution in the organic acid diluent. Water is then added in an amount sufficient to convert any organic acid anhydride remaining to the corresponding acid. The cellulose ester, usually after the addition of a further quantity of water, is permitted to hydrolyze or ripen from a cellulose tri-ester to a cellulose ester of a lower degree of esterification having the desired solubility characteristics. During ripening not only are acyl groups hydrolyzed off but in addition combined sulfuric acid is removed. Water and/or other non-solvent for the cellulose ester is then added in sufficient amounts to precipitate the cellulose ester from solution. The precipitated cellulose ester is washed with water to remove as much acid and other non-cellulose ester materials as possible and is then subjected to a stabilizing treatment with the object of still further reducing its content of combined sulfuric acid. Any combined sulfuric acid imparts to the cellulose ester a tendency to decompose, degrade and/or discolor. The degree of stability is measured by the degree of acidity developed when a sample of the cellulose ester is treated with distilled water at elevated temperature and pressure for a predetermined period of time. The development of excess acidity denotes a product of unsatisfactory stability.

Fully esterified or unhydrolyzed esters of cellulose, such as, for example, cellulose tri-acetate, are usually of an unsatisfactory degree of stability. This is probably due to the fact that the esters have not undergone any hydrolysis and, therefore, little or none of the combined sulfuric acid has been split off. Furthermore, stabilization of these fully esterified cellulose esters does not have the desired effect since on precipitation from the esterifying medium the fully esterified cellulose esters normally precipitate in a hard and horny form instead of as a loose, open fiber. The hard and horny precipitated cellulose esters are not only difficult to wash but, in addition, strongly resist penetration by liquids, making any attempt at stabilization quite ineffective. Since the combined sulfuric acid cannot be removed, such fully esterified cellulose esters are not very stable and undergo rapid discoloration, degradation or decomposition, particularly when exposed to elevated temperatures as during molding operations.

I have found that fully esterified organic acid esters of cellulose of an excellent degree of stability and which may be precipitated with a soft, loose, open fibrous structure amenable to washing and drying may now be obtained. In accordance with my novel process, said fully esterified organic acid esters of cellulose may be obtained by dissolving a hydrolyzed organic acid ester of cellulose, prepared in the usual manner well known in the art, in a suitable catalyst-free solvent medium and then subjecting the cellulose ester while in solution to re-esterification at elevated temperature employing as the esterifying agent any desired organic acid anhydride. The reaction mixture is maintained at the elevated temperature until the desired degree of esterification takes place. The cellulose ester formed may then be precipitated from solution in fibrous form after excess anhydride is destroyed, by the addition of water thereto.

While my novel process is of particular value for the production of fully esterified organic acid esters of cellulose and fully esterified mixed organic acid esters of cellulose, it is to be understood that the re-esterification may, of course, be halted at any point short of the formation of the fully esterified cellulose tri-ester. In this way, highly stable organic acid esters of cellulose and mixed organic acid esters of cellulose of any higher degree of esterification may be formed from organic acid esters of cellulose of lower degree of esterification. On precipitation these cellulose esters are obtained in a loose, open fibrous structure which is relatively easily washed and dried. Surprisingly enough, I have also found that the organic acid esters of cellulose of higher degree of esterification prepared in accordance with my novel process possess a substantially more satisfactory degree of stability than the initial, hydrolyzed cellulose esters from which they are prepared by the re-esterification process described.

Thus, for example, in the preparation of cellulose acetates of a higher degree of acetylation, e. g. 57 to 62.5% acetyl value, calculated as acetic acid, from hydrolyzed cellulose acetates of a lower degree of acetylation, the cellulose acetate employed is dissolved in from 3 to 10 parts, based on the weight of the cellulose acetate of glacial acetic acid after which 0.1 to 2.0 parts by weight of acetic anhydride are added thereto. The amount of acetic anhydride added depends upon the degree of acetylation desired in the re-esterified cellulose acetate formed.

Without the addition of any esterification catalyst thereto, the reaction mixture may be heated to a temperature of 60 to 100° C., or more, for 6 to 200 hours to effect the desired re-acetylation. Depending upon the amount of acetic anhydride added to the reaction mixture and the time during which the reaction mixture is maintained at elevated temperature, cellulose acetates of any degree of acetylation up to and including the tri-acetate may be formed. The progress of the re-acetylation may be followed very closely by the usual solvent and chloroform tests, the solubility or lack of solubility in the various solvents or mixtures of solvents employed indicating the degree of acetylation which has taken place. The higher cellulose acetates thus formed may then be precipitated from solution by the addition of a suitable amount of water thereto. The cellulose acetates precipitate in the form of a soft, loose, white fiber, regardless of the degree of acetylation which has taken place. The precipitated cellulose acetates may be washed and dried quite readily. Higher cellulose acetates substantially free of combined sulfuric acid and of a very high order of stability are obtained by my process.

In order further to illustrate my invention, but without being limited thereto, the following examples are given:

Example I 10 parts by weight of hydrolyzed cellulose acetate of 49% acetyl value, calculated as acetic acid, are dissolved in 40 parts by weight of glacial acetic acid. To the solution obtained is added 5 parts by weight of acetic anhydride. The anhydride added comprises an amount sufficient to reacetylate this cellulose acetate to an acetyl value of 54.4%, plus a 10% excess. No catalyst is added. The reaction mixture is heated to 70° C. and maintained at this temperature for 24 hours. The re-acetylated cellulose acetate formed is precipitated from solution by the addition of an excess of water thereto. The loose, open fiber obtained is then washed neutral. On analysis, the cellulose acetate is found to have an acetyl value of 54.9%, calculated as acetic acid. The cellulose acetate is considerably more stable than the cellulose acetate from which it is prepared by re-acetylation, developing only ⅓ the acidity of the original cellulose acetate when heated in distilled water at elevated temperature and pressure.

Example II 10 parts by weight of hydrolyzed cellulose acetate of an acetyl value of 54.4%, calculated as acetic acid, are dissolved in 50 parts by weight of glacial acetic acid and 5 parts by weight of acetic anhydride are added thereto, the anhydride being sufficient to form a cellulose tri-acetate on reaction with the hydrolyzed cellulose acetate. No catalyst is present in the reaction medium. The latter is then heated to 90° C. and held at this temperature for 48 hours. At the end of the first 24 hours, the cellulose acetate has an acetyl value of 61.7%, calculated as acetic acid, and at the end of 48 hours is fully esterified to the tri-acetate, having an acetyl value of 62.5%. The cellulose tri-acetate is precipitated from solution by the addition of an excess of water thereto and the cellulose tri-acetate precipitates in the form of a very soft, loose, open white fiber that may be easily washed and dried. The cellulose tri-acetate obtained is soluble in cold chloroform and insoluble in acetone. On being heated with distilled water at elevated temperature and pressure the cellulose tri-acetate develops very little acidity, i. e. has a high order of stability.

While my invention has been more particularly described in connection with the preparation of improved cellulose acetates of a higher degree of acetylation, including cellulose tri-acetates, my novel process may, as stated, also be employed for the preparation of other organic acid esters of cellulose of a higher degree of esterification from organic acid esters of cellulose of a lower degree of esterification. Examples of other improved organic acid esters of a higher degree of esterification which may be obtained by my novel process are cellulose propionate, cellulose tri-propionate, cellulose butyrate and cellulose tri-butyrate as well as mixed esters of a higher degree of esterification and fully esterified mixed esters such as cellulose acetate-propionate, cellulose acetate-butyrate, cellulose acetate-stearate, cellulose acetate-laurate, cellulose acetate-crotonate and cellulose butyrate-crotonate.

It is to be understood that the foregoing detailed description is given merely by way of illustration and that many variations may be made therein without departing from the spirit of my invention.

Having described my invention, what I desire to secure by Letters Patent is:

1. A process for the production of cellulose tri-acetate from hydrolyzed cellulose acetate, which consists of dissolving a hydrolyzed cellulose acetate of an acetyl value of about 54.4%, calculated as acetic acid in glacial acetic acid, adding acetic anhydride to the solution obtained in an amount at least sufficient to form the desired tri-acetate, heating the reaction mixture produced to an esterifying temperature, and maintaining said mixture at the esterifying temperature for 48 hours until the cellulose acetate is fully esterified.

2. Process for the production of cellulose tri-acetate from hydrolyzed cellulose acetate, which consists of dissolving a hydrolyzed cellulose acetate of an acetyl value of about 54.4%, calculated as acetic acid in glacial acetic acid, adding sufficient acetic anhydride to the solution obtained to form the desired tri-acetate, heating the reaction mixture produced to a temperature of 60 to 100° C., and maintaining said mixture at the esterifying temperature for 48 hours until the cellulose acetate is fully esterified.

ROBERT D. ROWLEY.

REFERENCES CITED

The following references are of record in the file of this patent:

UNITED STATES PATENTS

| Number | Name | Date |
|---|---|---|
| 1,668,945 | Clarke et al. | May 8, 1928 |
| 1,668,946 | Clarke et al. | May 8, 1928 |
| 1,999,406 | Dreyfuss et al. | Apr. 30, 1935 |
| 2,053,280 | Fothergill | Sept. 8, 1936 |

FOREIGN PATENTS

| Number | Country | Date |
|---|---|---|
| 339,824 | Germany | Aug. 12, 1921 |